United States Patent
Stam

(10) Patent No.: US 6,403,942 B1
(45) Date of Patent: Jun. 11, 2002

(54) AUTOMATIC HEADLAMP CONTROL SYSTEM UTILIZING RADAR AND AN OPTICAL SENSOR

(75) Inventor: Joseph S. Stam, Holland, MI (US)

(73) Assignee: Gentex Corporation, Zeeland, MI (US)

( * ) Notice: Subject to any disclaimer, the term of this patent is extended or adjusted under 35 U.S.C. 154(b) by 0 days.

(21) Appl. No.: 09/531,211

(22) Filed: Mar. 20, 2000

(51) Int. Cl.[7] .............................. B60Q 1/02; H05B 37/02
(52) U.S. Cl. .......................... 250/214 AL; 250/208.1; 315/77; 362/83.1
(58) Field of Search ..................... 250/208.1, 214 AL, 250/214 D, 216; 315/77, 82, 83; 362/64, 81, 83.1

(56) References Cited

U.S. PATENT DOCUMENTS

| | | |
|---|---|---|
| 2,632,040 A | 3/1953 | Rabinow |
| 2,827,594 A | 3/1958 | Rabinow |
| 4,692,798 A | 9/1987 | Seko et al. |
| 4,862,037 A | 8/1989 | Farber et al. |
| 4,891,559 A | 1/1990 | Matsumoto et al. |
| 4,930,742 A | 6/1990 | Schofield et al. |
| 4,967,319 A | 10/1990 | Seko |

(List continued on next page.)

FOREIGN PATENT DOCUMENTS

| | | |
|---|---|---|
| DE | 2946561 | 5/1981 |
| FR | 2641237 | 7/1990 |
| FR | 2726144 | 4/1996 |
| JP | 8-166221 | 6/1996 |
| WO | 8605147 | 9/1986 |
| WO | 9735743 | 10/1997 |
| WO | 9843850 | 10/1998 |
| WO | 9947396 | 9/1999 |
| WO | 0022881 | 4/2000 |

OTHER PUBLICATIONS

Christopher M. Kormanyos, SAE Paper No. 980003, pp. 13–18, No date.

Franz–Josef Kalze, SAE Paper No. 980005, pp. 23–26, no date.

J.P. Löwenau et al., SAE Paper No. 980007, pp. 33–38, (no date).

Tohru Shimizu et al., SAE Paper No. 980322, pp. 113–117, (no date).

Primary Examiner—Stephone Allen
(74) Attorney, Agent, or Firm—Price, Heneveld, Cooper, Dewitt & Litton

(57) ABSTRACT

A headlamp control system for a motor vehicle includes a wave transmitting and wave receiving device for detecting objects. The headlamp control system determines the state of the vehicle headlamps based upon objects detected by the wave transmitting and wave receiving device. The wave transmitting and wave receiving device can be a radar, an optical radar, ultrasonic, or the like. An optical sensor can be used to detect ambient light or other vehicles.

10 Claims, 2 Drawing Sheets

U.S. PATENT DOCUMENTS

| | | |
|---|---|---|
| 5,036,437 A | 7/1991 | Macks |
| 5,124,549 A | 6/1992 | Michaels et al. |
| 5,235,178 A | 8/1993 | Hegyi |
| 5,329,206 A | 7/1994 | Slotkowski et al. |
| 5,416,318 A | 5/1995 | Hegyi |
| 5,426,294 A | 6/1995 | Kobayashi et al. |
| 5,430,450 A * | 7/1995 | Holmes ................... 342/69 |
| 5,451,822 A | 9/1995 | Bechtel et al. |
| 5,471,515 A | 11/1995 | Fossum et al. |
| 5,508,592 A | 4/1996 | Lapatovich et al. |
| 5,537,003 A | 7/1996 | Bechtel et al. |
| 5,550,677 A | 8/1996 | Schofield et al. |
| 5,614,788 A | 3/1997 | Mullins et al. |
| 5,660,454 A | 8/1997 | Mori et al. |
| 5,666,028 A | 9/1997 | Bechtel et al. |
| 5,715,093 A | 2/1998 | Schierbeek et al. |
| 5,796,094 A | 8/1998 | Schofield et al. |
| 5,837,994 A * | 11/1998 | Stam et al. ............... 250/208.1 |
| 5,841,126 A | 11/1998 | Fossum et al. |
| 5,923,027 A | 7/1999 | Stam et al. |
| 5,942,853 A | 8/1999 | Piscart |
| 5,990,469 A | 11/1999 | Bechtel et al. |
| 6,008,486 A | 12/1999 | Stam et al. |
| 6,049,171 A * | 4/2000 | Stam et al. .................... 315/82 |
| 6,097,023 A | 8/2000 | Schofield et al. |
| 6,144,158 A | 11/2000 | Beam .......................... 315/82 |

* cited by examiner

AUTOMATIC HEADLAMP CONTROL SYSTEM UTILIZING RADAR AND AN OPTICAL SENSOR

FIELD OF THE INVENTION

The present invention pertains to automatic headlamp control using a wave transceiver.

BACKGROUND ART

It has long been desired to provide an automatic headlamp system which is capable of automatically switching between low and high beam headlamps when oncoming and preceding vehicles are detected. Several systems have been developed to fulfill this need. For example, numerous systems utilize an optical sensor, such as a silicon photodiode, to sense the light from the headlamps of an oncoming vehicle. Although commercialized many years ago, these systems are not currently commercially available due to difficulties sensing vehicle tail lamps and an inability to distinguish between lamps on other vehicles and non-vehicular light sources such as street lights and houses.

More recently systems have been developed that employ an electronic imaging system to detect lights from oncoming and preceding vehicles. Such systems perform far more satisfactorily than non-imaging light sensor systems due to their ability to make intelligent decisions about the relevance of different light sources. In general, the relevance of a light source to head light brightness control is determined using information about a light source's brightness, position, and color. A system of this type is disclosed in U.S. Pat. No. 5,837,994, entitled CONTROL SYSTEM TO AUTOMATICALLY DIM VEHICLE HEAD LAMPS, issued to Joseph Scott Stam et al. on Nov. 17, 1998, the disclosure of which is incorporated herein by reference. This system determines the presence of other vehicles based upon the luminance projected onto an imaging system from the lamps of the other vehicles.

Although imaging systems provide significantly better performance than non-imaging systems, efforts continue toward the development of further improvements in automatic headlight control systems for a number of reasons. In order to avoid dazzling an oncoming driver, an automatic high beam dimming system should switch to low beams by the time an oncoming vehicle is within about 700 feet of the controlled vehicle. In order to handle the wide brightness variations in commercial headlamps found on different vehicles, the system must be set up to transition from high to low beams when the illumination projected onto the controlled vehicle's imaging system from an oncoming vehicle's headlamp reaches a threshold corresponding to the lowest output headlamp that is commercially available being within 700 feet of the control vehicle. However, if the oncoming vehicle has a high output headlamp, the projected illumination will reach that threshold when the oncoming vehicle is significantly farther than 700 feet away. As a result, the headlamps will transition from high to low beams prematurely in the presence of a vehicle having higher output headlamps. Although this behavior is not distracting to drivers, it does not allow for maximum utilization of the high beam headlamps. An additional complication occurs when the oncoming or preceding vehicle is traveling at an angle to the control vehicle, as occurs on curves, rather than exactly in parallel with the control vehicle. Headlamp and tail lamp brightness is greatest directly in front of the lamps, and decreases rapidly as the off-center angle (the angle relative to a line projecting straight out directly in front of the lamp) increases. This characteristic of vehicle headlamps and tail lamps greatly reduces the ability of a light responsive system to accurately detect the presence of another vehicle when the other vehicle is not traveling parallel with the controlled vehicle. Additionally, vehicle taillights can be particularly difficult to detect due to the wide variation in brightness of taillights on different vehicles and their susceptibility to diminished brightness due to environmental conditions, such as rain, fog and the presence of salt or dirt on the lamp lens.

In addition to its other capabilities, the system disclosed in U.S. Pat. No. 5,837,994 can make an estimate of the distance to another vehicle. This estimate is made by assuming that light sources have a common brightness and then estimating the distance to a light source as being proportional to the inverse of the square root of the projected luminance. To accurately measure the distance, it is necessary to know the actual brightness of the light source. Due to the wide variations in brightness of headlamps and tail lamps commercially offered on vehicles, and other issues described hereinabove, it is only possible to approximate the distance of another vehicle using this method.

Another technique for measuring the distance of a vehicle is disclosed in Japanese Laid-open patent application No. Heisei 6-312056, published Jun. 25, 1996. This application discloses an image sensor used to capture an image of on oncoming vehicle and determines the distance to the vehicle based on the spacing of the two headlamps of the vehicle in the image. A very high resolution image sensor is necessary to properly resolve the two headlamps as distinct objects in the image. In addition to the expensive high-resolution image sensor, such a system would require high quality optics as well as a sophisticated processing system to process the large amount of image data in a reasonable time. Therefore such a system is currently too expensive to be commercially viable. Furthermore, even after processing the light information through such a costly system, the accuracy is low. The low accuracy is due to a number of variables including the problem that the spacing of the headlamps on the vehicle is necessarily estimated since this spacing varies on different vehicles and it is not known whether the other vehicle is traveling in parallel with the subject vehicle.

Advanced headlamp systems transition from high beam to low beam gradually to maximize the available road illumination to the driver of the control vehicle without negatively impacting other drivers. These systems may additionally vary the vertical aim of headlamps or steer the beams horizontally. Such headlamp systems and their control are described in U.S. Pat. No. 5,837,994 entitled CONTROL SYSTEM TO AUTOMATICALLY DIM VEHICLE HEAD LAMPS, issued to Jon Bechtel et al. on Nov. 17, 1998; U.S. Pat. No. 6,049,171, entitled CONTINUOUSLY VARIABLE HEADLAMP CONTROL, filed on Sep. 18, 1998, by Joseph Scott Stam et al.; and U.S. patent application Ser. No. 09/528,389, entitled IMPROVED VEHICLE LAMP CONTROL, filed by Joseph Stam on the same date as this application, the disclosures of all of which are incorporated herein by reference thereto. These more sophisticated headlamp systems would further benefit from knowing the actual distance, speed and location of oncoming or preceding vehicles.

Accordingly, it is desirable to provide a more effective system for controlling the headlights of a vehicle.

BRIEF DESCRIPTION OF THE DRAWINGS

The subject matter that is regarded as the invention is particularly pointed out and distinctly claimed in the claim portion that concludes the specification. The invention, together with further objects and advantages thereof, may best be understood by reference to the following description taken in conjunction with the accompanying drawings, where like numerals represent like components, and in which:

DETAILED DESCRIPTION OF THE INVENTION

A wave transceiver device 101 is mounted on a vehicle 100 and oriented in a generally forward direction. The wave transceiver device 101 is positioned to receive the reflections of waves emitted by the transceiver device off of objects in front of the vehicle 100. The wave emitting device may be a radar system operating for example in a range exceeding 1 GHz (77 GHz is designated for vehicular radar in many European countries) or an optical radar utilizing, for example, laser diodes for the wave emitting device. Alternatively, the wave emitting device may be an ultrasonic transducer emitting ultrasonic waves. The wave emitting device 101 may be scanned across the forward field to cover various angles. For the purposes of this invention the term radar will be used to encompass all of these concepts. The invention should not be interpreted as being limited to any specific type or configuration of wave transmitting or wave receiving device. The transmitter and receiver may each be mounted within a respective housing or both may be mounted in a common housing.

Figure 1:
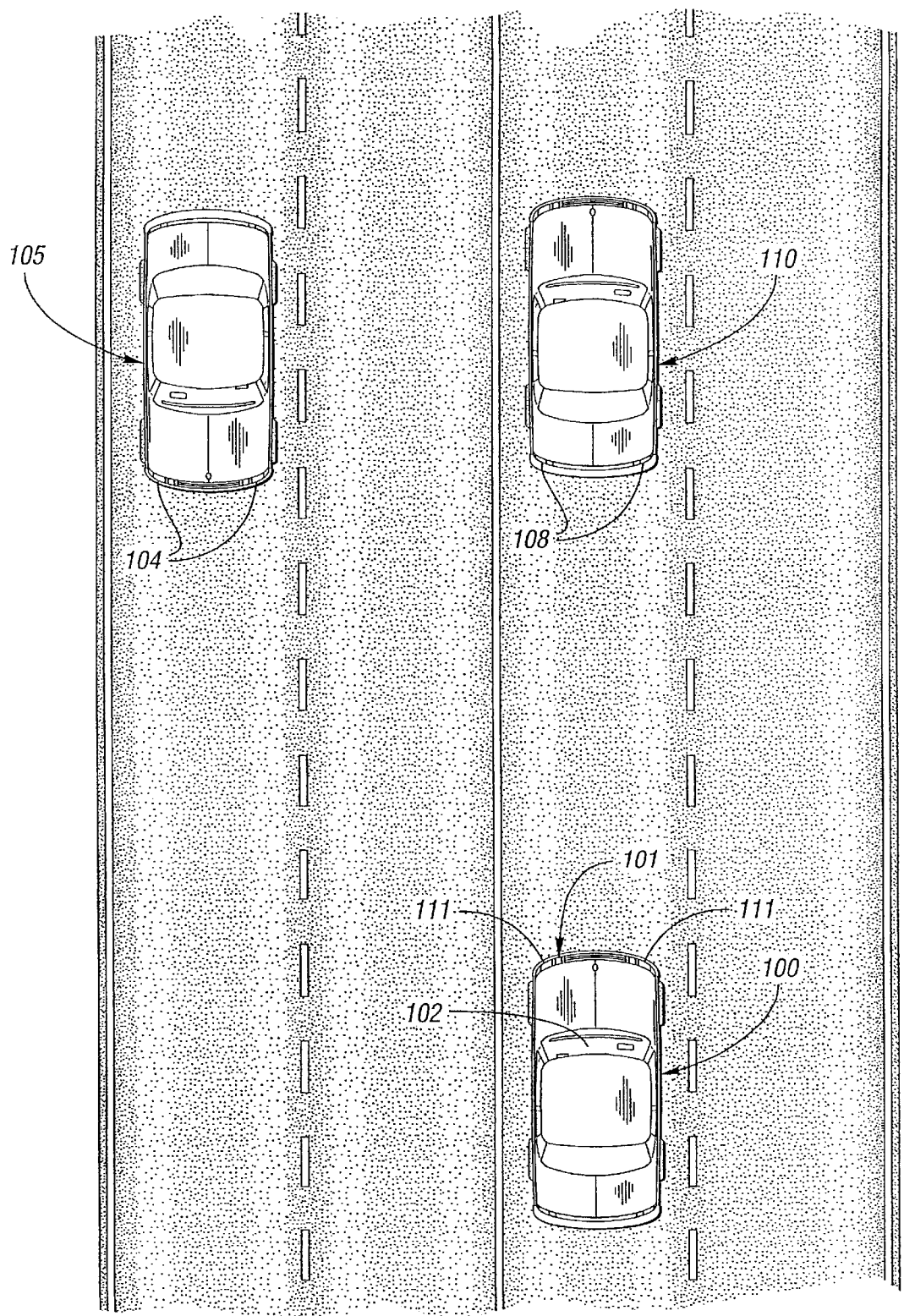
FIG. 1 illustrates a plurality of vehicles sharing a road.
Figure 2:
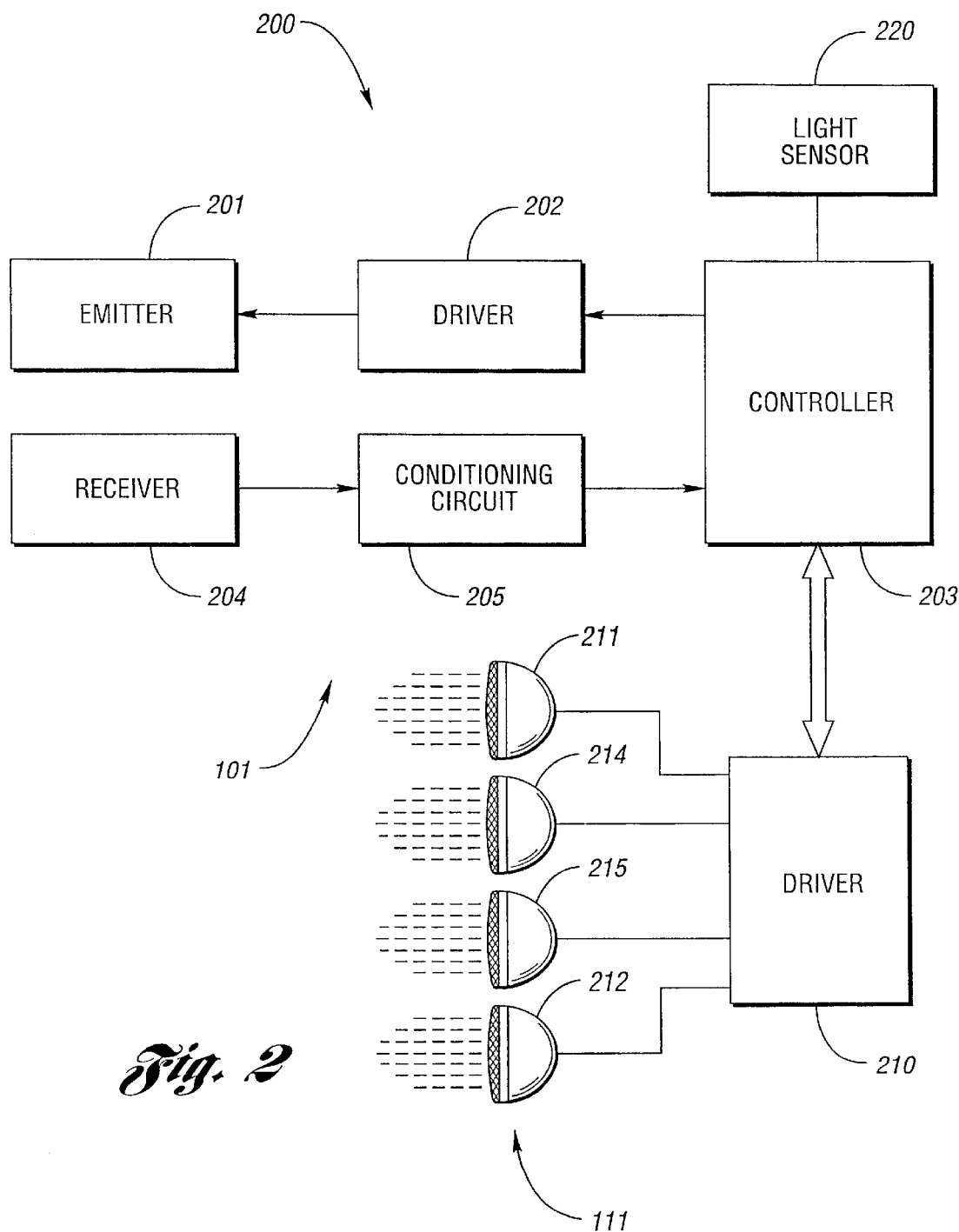
FIG. 2 illustrates an electrical system in a vehicle of FIG. 1 and including a wave sensitive headlamp control.

A radar processing system 200 (FIG. 2) controls the wave transmitting section 201, 202 and interprets the signal received by the wave receiving section 204, 205 to determine the presence of objects as well as the speed and direction of such objects. A headlamp controller 203 receives target information from the radar processing system, and may optionally also receive signals from the vehicle speed sensor (such as a speedometer) and direction sensor (such as a compass) and generates a decision signal which determines the state of the vehicle headlamps 111. The communication between the radar processing system, the vehicle speed sensor, the vehicle direction system and the vehicle headlamps my be by one of many mechanisms including direct wiring through a wiring harness or by a vehicle communication network such as the CAN bus. Additionally, systems such as the radar processing system and the headlamp controllers may be implemented by a single integrated processor or by multiple processors.

More particularly, the headlight control system contains a radar processing system which includes a wave transmitting section and a wave receiving section. The transmitter section includes an emitter 201 and a receiver 204. The transmitter may be implemented using an antenna for a conventional radar, a light source for optical radar, an ultrasonic emitter, an antenna system for a Doppler radar system, or the like. A driver 202 is connected to the emitter 201 to condition signals from controller 203 so that emitter 201 produces signals which when reflected can be detected by the detector 204. The driver 202 may be implemented using a pulse modulator, a pulse shaper, or the like.

The receiver section includes a detector 204 and a conditioning circuit 205. The detector 204 may be implemented using an antenna in a conventional radar system, a light receiving element in an optical radar system, an ultrasonic receiver, a wave guide antenna in a Doppler radar system, or the like. The detector 204 is connected to a conditioning circuit 205, which conditions the signals detected by the receiver for further processing by microcontroller 203. The conditioning circuit may include a demodulator, a filter, an amplifier, an analog-to-digital converter (ADC), combinations thereof, and the like. The microcontroller 203 may be implemented using a microprocessor, a digital signal processor, a microcontroller, a programmable logic unit, combinations thereof, or the like.

The operation of a radar to determine the presence of objects relative to a vehicle is well known, and will not be described in greater detail hereinbelow. For example, the time between the transmitted wave and the detection of the reflected wave may be used to determine the distance of an object. The movement of an object over successive transmission/reception cycles may be used to determine an object's relative speed and direction. Doppler radar may also be used to determine the objects speed. The magnitude of the reflected wave may be used to determine the size or density of the detected object.

In order to properly control the high beam state of the controlled vehicle it is necessary to determine if an object detected by the radar processing system 200 is a vehicle or a stationary object and, if a vehicle, whether the vehicle is an oncoming vehicle 105 or preceding vehicle 110. This can be accomplished by comparing the speed and direction of the object with the speed and direction of the control vehicle 100. The speed and direction of travel of the object is obtained using the radar principles described above. The speed of the controlled vehicle 100 may be obtained from a speed sensor on the vehicle, a global positioning system (GPS) system, or the like. The direction of the controlled vehicle 100 may be obtained from a compass sensor, a steering wheel turn indicator, a GPS, or the like.

Once this information is obtained, a simple set of criteria is applied to determine if the object is a vehicle or a stationary object. If an object is stationary, it will be moving in a direction opposite the control vehicle 100 at the same speed as the control vehicle. If an object is an oncoming vehicle 105, it will be traveling in a direction approximately opposite the control vehicle 100 at a speed substantially faster than that of the control vehicle. Finally, if an object is not moving relative to the controlled vehicle or the object is moving at a rate substantially slower than the controlled vehicle, the object is likely a preceding vehicle 104. The distance at which the high beams are dimmed may be a function of the speed of the object and the controlled vehicle, and may also be a function of the angle between an axis straight forward of the controlled vehicle 100 and the oncoming vehicle 105 or preceding vehicle 110 identified.

In a more advanced system, the headlamp control system not only controls the high/low beam state of the headlamps 211, 212, and bright lamps 214, 215, based on the distance between the controlled vehicle and the objects detected, but may also vary the brightness of the high beam headlamps and low beam headlamps to provide a continuous transition between the two beams as a function of the distance to the nearest other vehicle, thus maximizing the available luminance provided to the driver of the controlled vehicle without annoying the other driver. A continuously variable headlamp system is disclosed in U.S. Pat. No. 6,049,171, entitled CONTINUOUSLY VARIABLE HEADLAMP CONTROL, filed on Sep. 18, 1998, by Joseph Stam et al., the disclosure of which is incorporated herein by reference thereto. The headlamp control system may also vary the aim of the controlled vehicle's headlamp in the horizontal or vertical direction based on the relative position of the other vehicle whereby the headlamps are steered away from that other vehicle. The system may be configured to transition between more than two beams or may be configured to perform a combination of aiming and varying the brightness of one or more lamps. The headlamp processing system may also use the vehicle direction input to determine the proper horizontal aim of the headlamps to provide better illumination when traveling on curves. An LED headlamp that facilitates aiming is disclosed in the U.S. patent application Ser. No. 09/528,389 which is incorporated herein above by reference thereto. Other known mechanical headlamp steering systems, such as mechanical steering systems, could be used to shift the headlamp beams.

A light sensor 220 can be used to detect ambient light levels and may optionally provide other light conditions. The light sensor may be implemented using a non-imaging sensor such as a silicon photodiode, particularly advantageous photodiode sensors and systems being disclosed in U.S. patent application Ser. No. 09/237,107, entitled PHOTODIODE LIGHT SENSOR, filed by Robert Nixon et al., and U.S. patent application Ser. No. 09/491,192, entitled VEHICLE CONTROL SYSTEM WITH SEMICONDUCTOR LIGHT SENSOR, filed by Jon Bechtel et al. on Jan. 25, 2000, the disclosures of which is incorporated herein by reference thereto, although other non-imaging photocells could be used such as cadmium sulphide (CdS) cells, or the like. Additionally, a non-imaging light sensor can be used to detect forward light sources in addition to detecting ambient light conditions. The light sensor can be implemented using an imaging system in addition to, or instead of, the non-imaging light sensor. Imaging systems are disclosed in U.S. Pat. No. 5,837,994, entitled CONTROL SYSTEM TO AUTOMATICALLY DIM VEHICLE HEAD LAMPS, issued to Jon Bechtel et al. on Nov. 17, 1998; and U.S. patent application Ser. No. 09/528,389, entitled IMPROVED VEHICLE LAMP CONTROL, the disclosures of which are incorporated herein by reference thereto. Thus, it is envisioned that a non-imaging sensor can be used to detect ambient light conditions, a non-imaging sensor can be used to detect forward light sources, an imaging system can be used to detect forward light sources, and an imaging system can be used to detect ambient light conditions, and any one or combination of these optical sensors can be used with radar to control the vehicle headlamps.

The optical system may contain filters to determine the color of a light source. The combination of an optical system with a radar system will better overcome the limitations present if only one of the optical and radar systems is used independently. For example, if a radar system is used independently of the optical system, an oncoming or preceding vehicle waiting at an intersection would be perceived by the radar system as a stationary vehicle. However, by combining an optical sensor with the radar system the lights on the waiting vehicle would indicate that a vehicle is present and the radar could determine the actual distance to the vehicle. In general, if an optical system is used, the optical system may be used to determine the presence of oncoming or preceding vehicles and the radar system may be used to determine the actual distance to such oncoming or preceding vehicle as well as the speed of that vehicle.

The presence of the radar system on the vehicle may enable features other than headlamp control to be implemented utilizing the same components as the headlamp radar, thus reducing the cost of the two systems combined. Such system may include, for example, adaptive cruise control, obstacle warning systems, collision avoidance systems, autonomous driving systems, or the like. In this case, the wave transmitting section, wave receiving section, and radar processing systems could be shared by all features while each feature has it's own processing system for determining a course of action based upon the information received from the radar processing system. It is also possible to integrate the processing systems from each feature into a single processor.

While the invention has been described in detail herein in accordance with certain embodiments thereof, many modifications and changes may be effected by those skilled in the art without departing from the spirit of the invention. Accordingly, it is intended to be limited only by the scope of the appending claims and not by way of details and instrumentalities describing the embodiments shown herein.

What is claimed is:

1. A headlamp control system for a motor vehicle, the system comprising:
   a radar transmitting and receiving device for detecting objects in front of the motor vehicle;
   at least one optical system for detecting at least one of ambient light levels and light sources forward of the motor vehicle; and
   a controller for controlling the state of the headlamps of the motor vehicle based upon any two or more of: (a) objects in front of the vehicle; (b) light sources forward of the vehicle; and (c) and ambient light levels.

2. The headlamp control system of claim 1, wherein the radar transmitting and receiving device is an optical radar transmitting and receiving device.

3. The headlamp control system of claim 1, wherein the optical system is a single semiconductor light sensor.

4. The headlamp control system of claim 1, wherein the optical system is an image array sensor.

5. The headlamp control system of claim 1, wherein the optical system is configured to determine the color of light sources forward of the motor vehicle.

6. The headlamp control system of claim 1, wherein the optical system is configured to determine the position in the field of view of light sources forward of the motor vehicle.

7. The headlamp control system of claim 1, wherein a non-imaging sensor is used to detect ambient light conditions and an imaging sensor is used to detect forward light sources.

8. The headlamp control system of claim 1, wherein a non-imaging sensor is used to detect forward light sources.

9. The headlamp control system of claim 1, wherein said radar transmitting and receiving device additionally serves to facilitate detection of objects for at least one of the following vehicle features: adaptive cruise control; autonomous vehicle control; obstacle warning; and collision avoidance.

10. A headlamp control system for a motor vehicle, the system comprising:
    an ultrasonic wave transmitting and receiving device for detecting objects in front of the motor vehicle;
    at least one optical system for detecting at least one of ambient light levels and light sources forward of the motor vehicle; and
    a controller for controlling the state of the headlamps of the motor vehicle based upon any two or more of: (a) objects in front of the vehicle; (b) light sources forward of the vehicle; and (c) ambient light levels.

* * * * *